Aug. 29, 1961     J. C. SMELTZER     2,998,532
LINEAR RAMP VOLTAGE WAVE SHAPE GENERATOR
Filed May 21, 1958
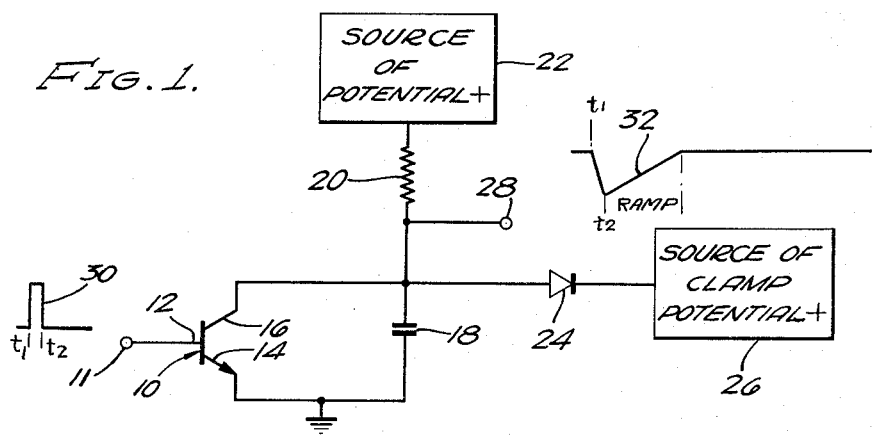
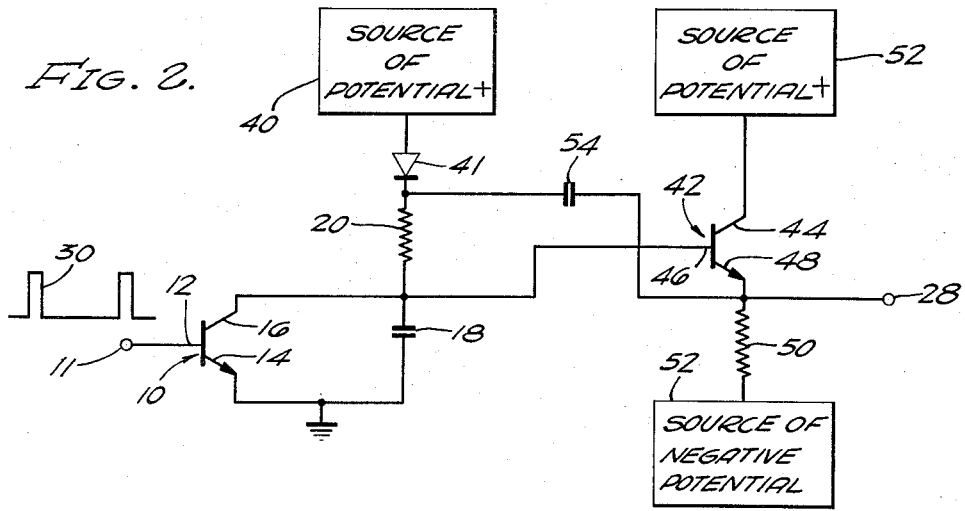
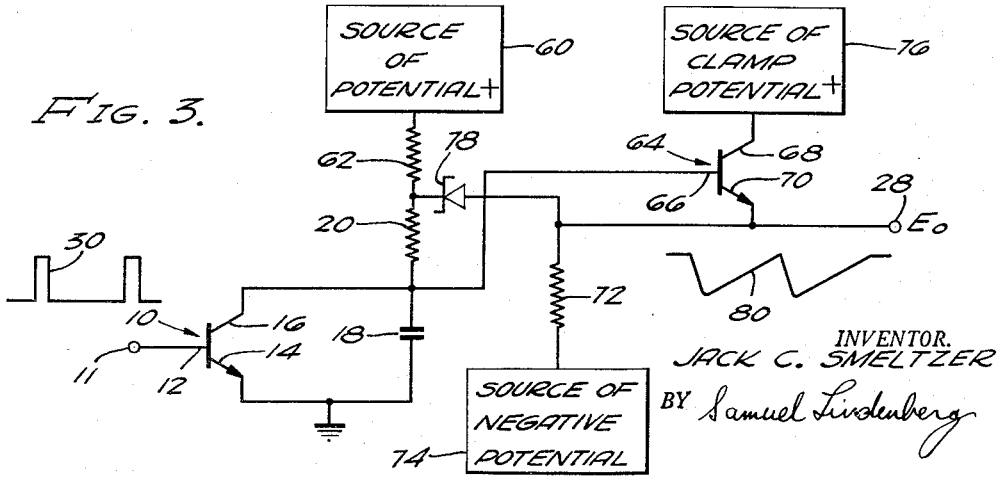
INVENTOR.
JACK C. SMELTZER
BY Samuel Lindenberg
ATTORNEY

United States Patent Office 2,998,532
Patented Aug. 29, 1961

2,998,532
LINEAR RAMP VOLTAGE WAVE
SHAPE GENERATOR
Jack C. Smeltzer, Torrance, Calif., assignor, by mesne assignments, to Thompson Ramo Wooldridge Inc., Cleveland, Ohio, a corporation of Ohio
May 21, 1958, Ser. No. 736,917
8 Claims. (Cl. 307—88.5)

This invention relates to wave shape generators and, more particularly, to an improved generator for providing linear ramp voltage wave shapes.

A customary arrangement for generating a ramp voltage wave shape is a circuit for charging and discharging a capacitor. The ramp voltage wave shape is established across the capacitor when it is charged. There are many applications wherein it is desirable to obtain one ramp voltage wave shape in response to each pulse employed to signal for a ramp voltage. These pulses are applied to the discharge circuit path in response to which the capacitor is discharged and then charged up again, thereby providing the ramp voltage. In order to obtain an optimum of linearity for the ramp voltage wave shape as the capacitor is being charged up, it has been customary to charge the capacitor through a resistor from a high-value source of potential. It will be appreciated that the use of a high-value source of charging potential is a deterrent against the use of transistors for constructing linear ramp voltage wave shape generators since transistors are low-voltage circuit elements.

An object of this invention is to provide a linear ramp voltage wave shape generator employing transistors which does not require high charging voltages.

Another object of this invention is the provision of a transistorized ramp wave shape generator which provides linear ramp voltage wave shapes.

Still another object of the present invention is the provision of a novel, useful, and simple transistor ramp voltage wave shape generator.

These and other objects of the invention are achieved in a circuit employing a capacitor which has a discharging circuit including a first transistor and a charging circuit, including a resistor through which charging current for the capacitor is provided. By maintaining the voltage drop across the resistor during the charging interval constant, the current into the capacitor is maintained constant, and the ramp voltage wave shape is maintained linear.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a circuit diagram of the presently known transistorized ramp voltage wave shape generator which is shown to assist in an understanding of the invention;

FIGURE 2 is a circuit diagram of a proposed transistorized voltage wave shape generator which is shown to assist in an understanding of the invention; and FIGURE 3 is a circuit diagram of an embodiment of this invention.

FIGURE 1 is a circuit diagram of a presently known ramp voltage wave shape generator. It includes a transistor 10 having base 12, emitter 14, and collector 16 elements. Between the collector 16 and emitter 14 there is connected a capacitor 18. A charging path for the capacitor 18 includes a resistor 20, which connects the capacitor 18 to a source of potential 22. The emitter 14 is connected to ground. A diode 24 is connected from the capacitor 18 to a source of clamping potential 26. Output may be taken from a terminal 28 which is connected to the junction between the resistor 20 and capacitor 18. In order to derive a ramp voltage output 32, pulses 30 of the type shown are applied to the input terminal 11 connected to the base 12 of the transistor 10. Each pulse enables the capacitor 18 to be discharged between collector and emitter. Thereafter, at the termination of the pulse, charging potential flows through the resistor 20 into the capacitor 18.

After the transistor 10 cuts off, the capacitor charges towards the value of the potential of the source 22 until it reaches the value of the clamping potential source 26. In order to make the rise in voltage, which is the desired ramp, linear, the value of the potential source 22 must be made very much greater than the value of the clamping potential source 26, or large enough so that the capacitor will charge linearly during the time that the diode 24 does not conduct. It is oftentimes inconvenient, if not impossible, to use a high-charging potential with transistors. Accordingly, it is desirable to achieve linearity in another way. The "bootstrap" circuit is a common means of achieving linearity without high voltages. It employs a discharge tube and a cathode-follower tube for providing charging feedback.

FIGURE 2 is a circuit diagram showing a transistor bootstrap circuit analogous to the one employing tubes for generating ramp voltage wave shapes. The tube circuit is well known and is shown and described on pages 269–270 of the book "Waveforms" by Chance et al., published by the McGraw-Hill Book Company in 1949. This includes a discharge circuit for the capacitor 18 which, as before, includes a transistor 10 with the base 12, collector 16, and emitter 14 serving an identical function as was shown and described in FIGURE 1. The charging resistance 20 is connected to a source of potential 40 through a diode 41. In addition to the charging path from the source of potential 40, another path is provided which includes a transistor 42 having a collector 44, a base 46, and an emitter 48. The base 46 of transistor 42 is connected to the junction of the resistor 20 and the capacitor 18. A load resistor 50 is connected to the emitter of the transistor 42. The source of operating potential 52 is connected to the collector 44 of the transistor 42. In addition, a source of negative potential 52 is connected to the resistor 50. A condenser 54 connects the emitter 48 to the end of the resistor 20, which is connected to the diode 41.

The arrangement for the transistor 42 will be recognized as an emitter follower circuit, which effectively is the transistor analogue of a cathode-follower tube. The circuit shown in FIGURE 2 does not operate to generate ramp voltages of the type designated by reference numeral 32 because the condenser 54 will discharge, and thereby prevent a constant voltage being maintained across resistor 20 during the capacitor charging time, whereby the ramp obtained will be nonlinear.

FIGURE 3 is a circuit diagram of an embodiment of the invention which provides linear ramp voltage wave shapes using transistors and not using high voltages. The transistor 10 performs the same discharge functions for capacitor 18 as was described in connection with FIGURE 1. A source of potential 60 is connected through resistor 62 to the charging resistor 20. A second transistor 64, having a base 66, a collector 68, and an emitter 70, is employed. A load resistor 72 is connected from a source of negative potential 74 to the emitter 70. A source of clamp potential 76 is connected to the collector 68. A feedback path is provided for the resistor 20. This path includes a diode 78, having the characteristic that the voltage drop thereacross will remain substantially constant despite variations in the current through it. The diode 78 will be recognized as a Zener diode, which is a very well known circuit element. It has the desired characteristic within a specified voltage range which is identified from its characteristic curve.

In operation, a narrow pulse 30 may be applied to the base 12 of the transistor 10. This enables the transistor 10 to conduct, whereby the capacitor 18 is discharged. At the end of the pulse, the transistor 10 becomes a high impedance across the capacitor 18, and the capacitor then charges up through the resistor 20. The charging current is $$\frac{E_z}{R_z}$$

where $E_z$ is the Zener voltage of the Zener diode 78 and $R_z$ is the value of the charging resistance 20. The output voltage $E_O$, which is derived from the emitter of the transistor 64, follows very closely the voltage on the capacitor 18 because of the emitter-follower connection. However, the characteristics of the Zener diode 78 causes the voltage drop across it to remain constant as the voltage across the capacitor 18 changes. This also maintains the voltage across the charging resistor 20 constant, since the base-to-emitter voltage of transistor 64 is very low and its change is insignificant, compared to the value of the Zener voltage. The source of potential 60 and the resistor 62 have their values selected to assist in maintaining the Zener diode 78 at the optimum portion of its characteristic. The source of potential 74 biases the transistor 64 for emitter-follower operation.

The transistor 64 performs a secondary function in this circuit, which is similar to the function of the diode 24 in FIGURE 1. When the voltage across the capacitor 18 exceeds the value of the clamp potential 76, the base collector junction of the transistor 64 conducts heavily, limiting the voltage to which the capacitor 18 can be charged. The value of the source of potential 76 can be established to limit the maximum value which the voltage on capacitor 18 can attain. The circuit shown in FIGURE 3 can provide either a single ramp voltage wave shape output in response to a single pulse input or in response to repetitive pulses having the waveform 30, a waveform 80 may be obtained from the emitter 70.

It should be further noted that while in the above descriptions this invention is described as being operated in response to a pulse or pulses to produce a ramp voltage the utility of this invention is not to be thus restricted. Where it is desired to immediately obtain the ramp or capacitor charge portion of the output wave shape without going through the capacitor discharge portion of the wave shape then transistor 10 is maintained conducting by the application of a bias to the base 12. This maintains capacitor 18 in its discharged state. Immediately upon removal of the bias transistor 10 attains a high impedance value and capacitor 18 can be charged thus providing the desired ramp voltage immediately. Upon reapplication of the bias then capacitor 18 is discharged rapidly to its quiescent condition. This mode of operation may be preferred where it is desired to effectuate the usual type of cathode ray tube display. Effectively the removal of the bias from the base of transistor 10 may be accomplished by a pulse having a suitable polarity for overcoming this bias.

From the above description, it will be seen that by this invention a circuit is provided which generates a linear ramp voltage wave shape, employing transistors and low voltages. There is no lower limit to the frequency of operation because of the direct-coupled nature of the feedback path including the Zener diode. More linear ramp voltages can be generated because a constant voltage is maintained across the charging resistor at all times, in view of the operating characteristics of the Zener diode. Potential 60 provides charging voltage, however, in view of the regulatory action of the feedback path, including the Zener diode the linearity of the ramp voltage is made substantially independent of the value of the source of potential 60.

The fact that this invention has been shown employing NPN type resistors, with positive potentials being applied to the collectors, should not be construed as a limitation, since those skilled in the art will readily recognize that PNP as well as other types of transistors may be employed with the proper polarity of applied voltages and of the Zener diode being used, without departing from the spirit and scope of this invention.

I claim:

1. A circuit for generating a ramp voltage comprising a first and a second transistor each having an emitter, base and collector, a capacitor connected between said first transistor collector and emitter, means coupling said second transistor base to said first transistor collector, a first resistor, a second resistor connected between said first resistor and said capacitor, diode means connected between said second transistor emitter and the connection between said first and second resistors for maintaining the voltage across said second resistor substantially constant while said capacitor is being charged, a signal input terminal connected to said first transistor base, and an output terminal connected to said second transistor emitter.

2. A circuit for generating a ramp voltage as recited in claim 1 wherein said diode means for maintaining the voltage drop across said second resistor substantially constant while said capacitor is being charged is a Zener diode.

3. A circuit for generating a ramp voltage comprising a first and second transistor each having an emitter, base and collector, a capacitor connected between said first transistor collector and emitter, a first resistor, means for applying a charging potential to one end of said first resistor, a second resistor connected between said first resistor other end and said first transistor collector, a connection between said first transistor collector and said second transistor base, a feedback connection between said second transistor emitter and the connection between said first and second resistor, said feedback connection including a diode having the characteristic that its resistance varies to maintain the voltage drop thereacross substantially constant, despite variations in current flowing therethrough a load resistor connected to said second transistor emitter, means for applying a potential to said load resistor, means for applying operating potential to said second transistor for limiting the optimum voltage to which said capacitor will charge, a signal input terminal connected to said first transistor base, and an output terminal connected to said second transistor emitter.

4. In a circuit for generating a ramp voltage wherein in response to an input signal a capacitor is enabled to be charged, an improved charging and limiting circuit for said capacitor including a resistor having one end connected to said capacitor, means to apply a charging potential to the other end of said resistor, a transistor having a collector, emitter and base, a connection between said resistor one end and said transistor base, a feedback path connected between said transistor emitter and the other end of said resistor including means for maintaining the voltage drop across said resistor substantially constant, and means for deriving an output from said transistor emitter.

5. In a circuit for generating a ramp voltage wherein in response to an input signal a capacitor is enabled to be charged, an improved charging and limiting circuit for said capacitor including a resistor having one end connected to said capacitor, means for applying a charging potential connected to the other end of said resistor, a transistor having a collector emitter and base, a connection between said resistor one end and said transistor base, means to apply a desired limiting value potential to said collector, a Zener diode connected between said transistor emitter and the other end of said resistor, a load resistor connected to said transistor emitter, means to apply a bias potential to said load resistor, and means to derive an output from said emitter.

6. A circuit for generating a ramp voltage comprising a capacitor, a charging circuit connected to said capacitor, a discharging circuit connected across said capacitor, an output circuit including a capacitor charge limiting circuit connected to said capacitor, and a circuit for maintaining linear the charging of said capacitor by said charging circuit connected between said output circuit and said charging circuit, said circuit including a circuit element having the property that the voltage drop thereacross is substantially constant despite variations in current passing therethrough.

7. A circuit for generating a ramp voltage as recited in claim 6 wherein said circuit element is a Zener diode.

8. A circuit for generating a ramp voltage as recited in claim 6 wherein said capacitor charge limiting circuit is an emitter follower circuit.

References Cited in the file of this patent

UNITED STATES PATENTS

| | | |
|---|---|---|
| 2,708,240 | Casey | May 10, 1955 |
| 2,837,663 | Walz | June 3, 1958 |
| 2,891,173 | Helbig | June 16, 1959 |
| 2,892,952 | McVey | June 30, 1959 |
| 2,905,835 | Wray | Sept. 22, 1959 |
| 2,933,623 | Jones et al. | Apr. 19, 1960 |